United States Patent
Kulkarni et al.

(10) Patent No.: US 7,933,872 B2
(45) Date of Patent: *Apr. 26, 2011

(54) DATABASE BACKUP, REFRESH AND CLONING SYSTEM AND METHOD

(75) Inventors: Ravi Kulkarni, Chandler, AZ (US); Yury Tomashevich, San Carlos, CA (US); Ignatius Fernandez, Pleasant Hill, CA (US)

(73) Assignee: Corio, Inc., San Carlos, CA (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/060,628

(22) Filed: Apr. 1, 2008

(65) Prior Publication Data

US 2008/0183776 A1 Jul. 31, 2008

Related U.S. Application Data

(63) Continuation of application No. 10/930,263, filed on Aug. 30, 2004, now Pat. No. 7,389,314.

(51) Int. Cl.
*G06F 7/00* (2006.01)
*G06F 17/00* (2006.01)
(52) U.S. Cl. .......................... 707/640; 707/652; 711/162
(58) Field of Classification Search .......... 707/600–831; 711/161, 162
See application file for complete search history.

(56) References Cited

U.S. PATENT DOCUMENTS

| | | |
|---|---|---|
| 5,515,418 A | 5/1996 | Yamaguchi et al. |
| 5,642,505 A | 6/1997 | Fushimi |
| 6,374,267 B1 | 4/2002 | Tam |
| 6,487,558 B1 | 11/2002 | Hitchcock |
| 7,389,314 B2 * | 6/2008 | Kulkarni et al. ............ 1/1 |
| 7,707,184 B1 * | 4/2010 | Zhang et al. ............ 707/645 |

OTHER PUBLICATIONS

Attar et al., Site Initialization, Recovery, and Backup in a Distributed Database System, Nov. 1984, IEEE, 645-650.*
Salzberg et al, DSDT: Durable Scripts containing Database Transactions, Feb. 26-Mar. 1, 1996, IEEE, 624-633.*
Jim-Min, Lin, Zeng-Wei, Hong, Guo-Ming, Fang, "MADSS: a multi-agent based distributed scripting system," Computer Software and Applications Conference, (Aug. 26-29, 2002), COMPSAC Proceedings, 26th Annual International Conference, pp. 581-586.
Robinson, J.N., "Grid Engine Script Generating Tool," 2003 IEEE Proceedings User Group Conference, Department of Defense, pp. 368-372.
"X-Clone User Guide," User Guide Edition 2.6, Aug. 2003, Babboo.com, http://www.babboo.com/downloads/XClone_user_guide.pdf, (63-pages).

* cited by examiner

*Primary Examiner* — Jean B Fleurantin
(74) *Attorney, Agent, or Firm* — Christopher & Weisberg, P.A.

(57) ABSTRACT

An automated physical database backup, refresh and cloning system and method automatically generates scripts or commands for implementing one or more tasks related to physical database backup and/or database and application refresh or cloning operations between a source environment and a target environment. The scripts or commands make use of parameters describing the source and target environments, at least some of which are gathered prior to initiating backup and cloning. The tasks are performed during one or more backup, refresh and cloning phases. In some embodiments, scripts are automatically regenerated and executed after a failure associated with the source or target environment.

20 Claims, 11 Drawing Sheets

DATABASE BACKUP, REFRESH AND CLONING SYSTEM AND METHOD

CROSS-REFERENCE TO RELATED APPLICATIONS

This application is a continuation of U.S. patent application Ser. No. 10/930,263, filed Aug. 30, 2004, and entitled DATABASE BACKUP, REFRESH AND CLONING SYSTEM AND METHOD, the entirety of which is incorporated herein by reference.

TECHNICAL FIELD

The disclosed embodiments relate generally to data processing, and in particular to a database backup and/or database and application refresh or cloning.

BACKGROUND

Today's business enterprises typically store data in databases. There is an increasing awareness among such enterprises that responsible data protection includes database backup, refresh and cloning. Other frequently used procedures include database and application refresh and cloning. Database backup includes periodically replicating data stored on a primary storage system and moving the copy to a secondary storage system at a safe location. Database and application refresh includes periodically replacing data stored in a database and a small portion of data in the application on a secondary storage system with data from a database and application on a primary storage system. Database and application cloning includes periodically replacing data stored in a database and a medium portion of data in the application on a secondary storage system with data from a database and application on a primary storage system. Refreshed and cloned databases are typically used for development, testing, training or reporting purposes.

If a disaster occurs resulting in the destruction of data on the primary storage system, then the copy is recovered from the secondary storage system and used to reconstruct or clone the primary storage system. Unfortunately, given the large amounts of data used by today's businesses, performing database backup and/or database and application refresh or cloning has become a time consuming and labor intensive task due at least in part to a lack of industry standardization.

Some database management systems allow logical backup of databases using export and import utilities (e.g., ORACLE 9i). A logical backup involves reading a set of database records and writing them to a file. These records are read independently of their physical location. For example, the ORACLE Export utility reads a database, including a data dictionary, and writes the output to a binary file called export dump file. The ORACLE Import utility reads the binary export dump file created by the Export utility and executes embedded commands to recover the data. Because logical backup utilities typically do not recover transactions, take a long time to perform and sometimes lack referential integrity (e.g., export is done one table at a time), many businesses prefer physical backup over logical backup. Moreover, since logical backup data records are read independently of their physical locations, a database administrator (DBA) may have to set up tablespaces, datafiles and users before the import, to properly specify the physical destinations of database objects.

Several vendors have developed hardware and software solutions for performing physical backup. Hardware solutions typically require coupling data protection appliances to a network owned and/or operated by the business. While a hardware solution may provide some advantages, for many businesses those advantages will be outweighed by the cost of the hardware and its maintenance. The software solutions for physical backup typically include a user interface for initiating data cloning operations in an ORACLE application environment. Such solutions, however, may require installation of client software throughout the network, which can also cause an organization to incur significant installation and maintenance costs. Some businesses subscribe to an application service provider (ASP) or application management outsourcer for information technology (IT) support and may want the ASP or outsourcer to provide the service remotely without engaging internal personnel, or may not have in-house IT personnel to provide installation and maintenance services. For such businesses, these traditional hardware and software solutions may not be appropriate because they can incur additional overhead costs, which could adversely impact profits, or could be forced to engage internal personnel that could be focused on other matters (e.g., engaging or hiring in-house IT personnel).

Accordingly, what is needed is a cost effective and efficient system and method of providing automated physical database backup and/or database and application refresh or cloning across networked, heterogeneous environments without a need for hardware appliances or client software installations.

SUMMARY OF THE EMBODIMENTS

The deficiencies of conventional systems and methods are overcome by an automated physical database backup and/or database and application refresh or cloning system and method, that automatically generates scripts or commands for implementing one or more tasks related to database backup and/or database and application refresh or cloning operations between a source environment and a target environment. The scripts or commands make use of parameters describing the source and target environments, at least some of which are gathered prior to initiating backup and cloning. The tasks are performed during one or more database backup and/or database and application refresh or cloning phases.

In accordance with one aspect, the present invention provides an automated, physical database backup method for use in a database backup computer system including a source environment, a target environment, and a control environment, in which, in the control environment, parameters relating to the source environment and the target environment are automatically determined. The source environment and the target have different configurations. Scripts for initiating one or more tasks relating to database backup operations between the source environment and the target environment are automatically generated. The automatically generated scripts include use of at least one parameter. A failure associated with at least one of the source environment and the target environment is automatically recognized. Information corresponding to the recognized failure is stored. The stored information corresponding to the recognized failure is used to automatically regenerate at least one script in response to the failure associated with at least one of the source environment and the target environments.

In accordance with another aspect, the present invention provides an automated physical database backup computer system including a source environment, a target environment, and a control environment, in which the control environment of the computer system has a discovery module. The discovery module automatically determines parameters relating to the source environment and the target environment. The source environment and the target environment have different configurations. A database backup module is configurable to automatically generate scripts for initiating one or more tasks related to database backup operations between the source environment and the target environment using at least one parameter, recognize a failure associated with at least one of the source environment and the target environments, storing information corresponding to the recognized failure and use the stored information corresponding to the recognized failure to automatically regenerate at least one script in response to the failure associated with at least one of the source environment and the target environments In accordance with another aspect, the present invention provides a computer-readable storage medium containing a computer software program, which, when executed by a processor in a control environment of an automated physical database backup system that also includes a source environment and a target environment, causes the processor to automatically determine parameters relating to the source environment and the target environment in which the source environment and the target environment have different configurations. The processor further automatically generates scripts for initiating one or more tasks relating to database backup operations between the source environment and the target environment in which automatically generating scripts includes using at least one parameter. The processor further automatically recognizes a failure associated with at least one of the source environment and the target environments, causes the storage of information corresponding to the recognized failure and uses the stored information corresponding to the recognized failure to automatically regenerate at least one script in response to the failure associated with at least one of the source environment and the target environments.

DESCRIPTION OF EMBODIMENTS

System Overview

The description that follows makes repeated references to various naming conventions, variables and utilities typically found in UNIX and ORACLE environments. It is assumed that the reader has a basic understanding of UNIX and ORACLE or can review one or more of the publicly available manuals or textbooks describing these widely used technologies.

Figure 1:
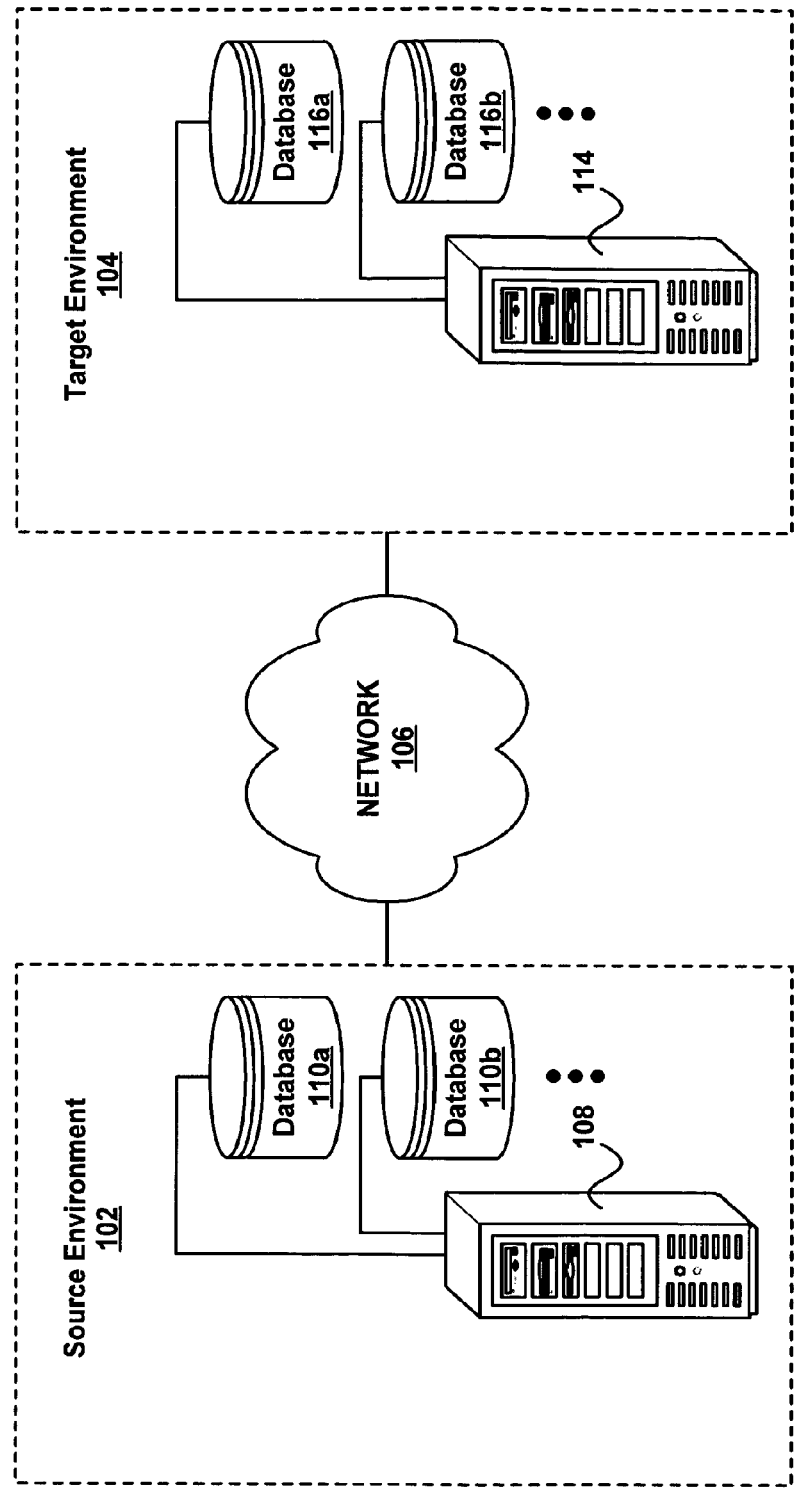
FIG. 1 is block diagram of an embodiment of an automated physical database backup and/or database and application refresh or cloning system.

FIG. 1 is block diagram of an embodiment of an automated physical database backup and/or database and application refresh or cloning system 100. The system 100 includes a source environment 102 (e.g., an application service provider (ASP)) and a target environment 104 (e.g., a datacenter) coupled to a network 106. The network 106 can be any computer network used to transfer data, including without limitation the Internet or an Intranet, a local area network (LAN), a wide area network (WAN), a storage area network (SAN), a wireless local area network (WLAN) and the like.

While only one source environment 102 and one target environment 104 are shown in FIG. 1, it should be apparent that multiple source environments 102 can communicate with multiple target environments 104 via multiple networks 106 using known distributed database technology (e.g., ORACLE distributed database architecture).

The source environment 102 includes a source server 108 and one or more databases 110. The source server 108 can be implemented on any suitable computing platform, but is preferably implemented on a UNIX-based platform (e.g., HP, SOLARIS, AIX, LINUX, etc.) to take advantage of existing UNIX utilities for copying and connectivity, such as Secure Socket Shell (SSH). Note that SSH is a secure command interface and protocol for securely gaining access to remote computers. It is widely used by network administrators to control Web and other kinds of servers remotely. SSH commands are encrypted and secure in several ways. For example, both ends of a connection are authenticated using a digital certificate and passwords are protected by encryption. In the embodiment shown in FIG. 1, the source server 108 is an SSH machine in the source environment 102 capable of making requests of agents (e.g., daemons) or SSH servers in the target environment 104. In some embodiments, the agents or servers perform various tasks associated with a database backup and/or database and application refresh or cloning process 300 in response to requests from the source server 108, as described more fully with respect to FIGS. 3-8.

The databases 110 are coupled to the source server 108 and include file systems and directories that can be accessed via a database management system (DBMS) (e.g., ORACLE RDBMS). During a backup operation, the source server 108 copies datafiles from one or more of the databases 110 and transfers the copied datafiles across the network 106 to the target environment 104.

The target environment 104 includes a target server 114 and one or more databases 116. The target server 114, and databases 116 can include conventional technologies, which can be the same technology or different technologies than found in the source environment 102. During backup, the datafiles belonging to one or more databases 110 can be copied to one or more storage devices attached to source server 108 or target server 114 depending upon the configuration. In the case of cloning, for example, the datafiles belonging to database 110a can be copied to and overlaid on top of database 110b in the source environment 102, or one or more databases 116 in the target environment 104.

It should be apparent that other topologies for the system 100 can have more or fewer servers, databases and/or applications included in the source and target environments 102, 104, as well as other devices typically found in a computer network environment. Additionally, the source and target environments 102, 104, can be physically located in the same facility and/or in one or more geographic locations throughout the world.

Source Server

Figure 2:
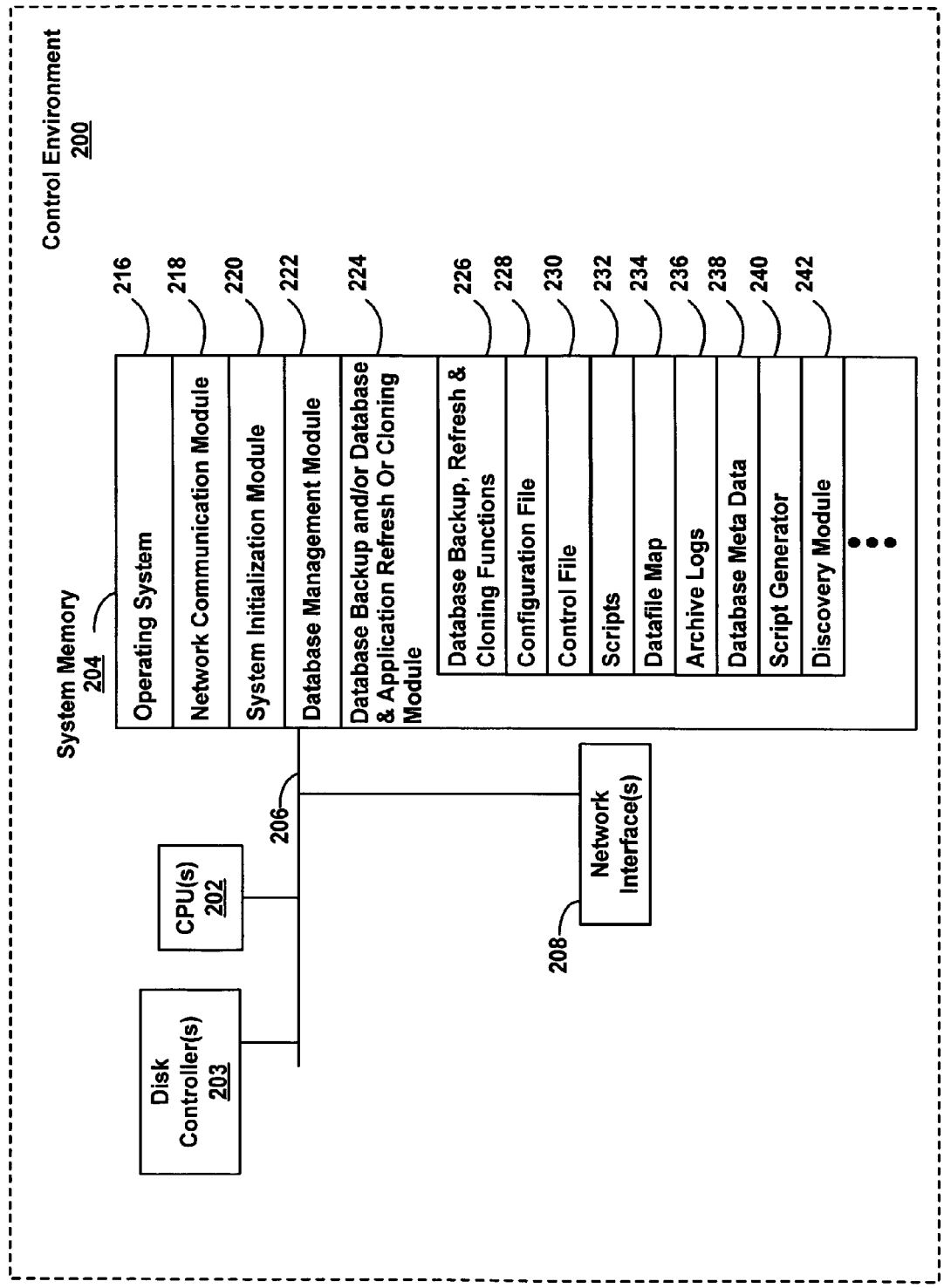
FIG. 2 is a block diagram of an embodiment of a control environment for controlling database backup and/or database and application refresh or cloning operations.

FIG. 2 is a block diagram of an embodiment of a control environment 200 for controlling database backup and/or database and application refresh or cloning operations. The control environment 200 includes one or more processing units (CPU's) 202 for executing software instructions, one or more network communications interfaces 208 for communicating over a network, one or more disk controllers 203 for connecting to storage devices (e.g., databases 110), system memory 204, and one or more communication buses 206 for interconnecting these components. System memory 204 can include one or more levels of a memory hierarchy (e.g., cache memory, secondary disk storage, etc.). The system memory 204 can include various memory types, including volatile memory, such as dynamic random access memory (DRAM), and may also include non-volatile memory, such as read only memory (ROM) or Flash memory. An exemplary computer program product for backing up a database as described herein is stored in a computer-readable tangible storage device such as secondary disk storage within system memory 204 for execution by CPU 202 via system memory 204.

Note that the control environment 200 may include more or fewer hardware devices and/or software applications depending on its configuration. For example, the network interfaces 208 may include one or more wireless transceivers for communicating with a WLAN. Additionally, the control environment 200 may be one or more server processes (e.g., threads) running on a single hardware platform and/or a collection of hardware platforms that are networked together and assigned to perform specific tasks (e.g., database server, backup server, etc.). The control environment 200 can reside in the source environment 102, the target environment 104, or a third environment independent of the source and target environments 102, 104.

In some embodiments, the memory 204 stores an operating system 216 (e.g., UNIX, LINUX, WINDOWS), a network communication module 218, a system initialization module 220, and a database management module 222. The operating system 216 generally includes procedures for handling various basic system services and for performing hardware dependent tasks. The network communication module 218 is used for connecting the source server 108 to other servers or computers in the system 100 (FIG. 1), and possibly to other servers or computers via one or more communication networks (wired or wireless), such as the Internet, other WLANs, LANs, and the like. The system initialization module 220 initializes other modules and data structures stored in memory 204 required for the appropriate operation of the control environment 200. The database management module 222 (e.g., ORACLE, IBM DB2, MICROSOFT SQL Server) is a collection of programs that enables a user to store, modify and extract information from databases 110.

The memory 204 also includes a database backup and/or database and application refresh or cloning module 224, which includes various software modules for handling database backup and/or database and application refresh or cloning operations between the source environment 102 and the target environment 104. In some embodiments, the module 224 includes one or more database backup, refresh and cloning functions 226, a configuration file 228, a control file 230, one or more scripts 232, a datafile map 234, one or more archive logs 236, database meta data 238, a script generator 240, and a discovery module 242. The system memory 204 may include other applications for handling various administrative functions and the like.

Figure 3:
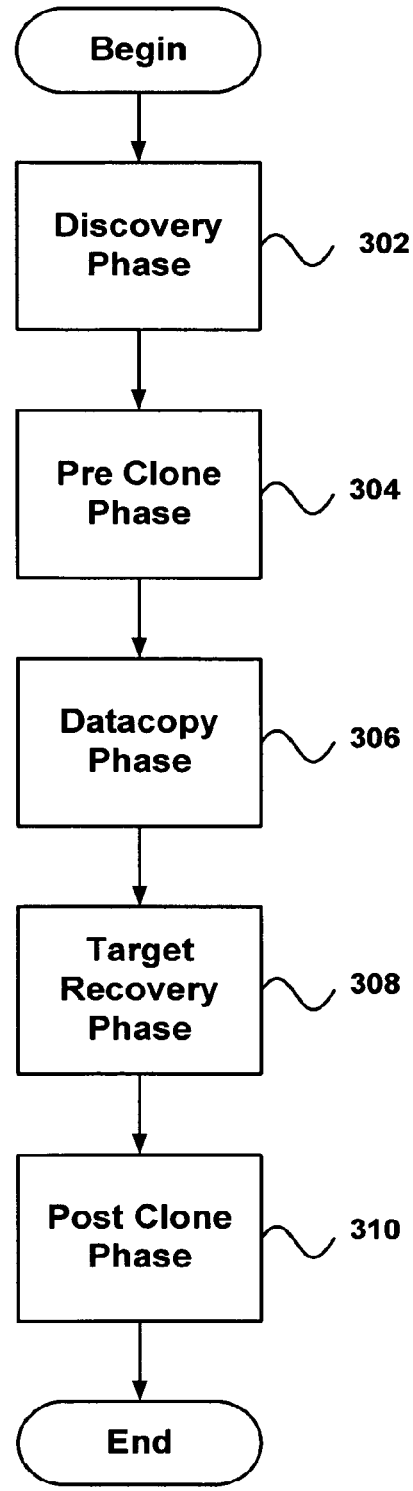
FIG. 3 is a flow diagram of an embodiment of an automated physical database backup and/or database and application refresh or cloning process performed by the system shown in FIG. 1.

The functions 226 include instructions, which, when executed by one or more processing units 202, implements various phases of the process 300, as described more fully with respect to FIG. 3. The configuration file 228 includes various configuration parameters for the process 300.

Table I below includes examples of configuration file parameters for performing a database backup and/or database and application refresh or cloning between a source environment 102 and a target environment 104.

TABLE I

Examples of Configuration File Parameters

| Configuration File Parameters | Descriptions |
| --- | --- |
| SOURCE_DATABASE | Specifies a source database in the source environment. |
| TARGET_DATABASE | Specifies a target database in the target environment. |
| SOURCE_SERVER | Specifies a source server in the source environment. |
| TARGET_SERVER | Specifies a target server in the target environment. |
| SOURCE_OWNER | Specifies an O/S account which owns the source database binaries and datafiles. |
| TARGET_OWNER | Specifies an O/S account, which will write the backup files in backup directories on a target database. |
| COMPRESS_UTILITY | Specifies a program used to compress datafiles. |
| UNCOMPRESS_UTILITY | Specifies a program used to uncompress datafiles. |
| CACHE_DIRECTORY | Specifies a location on the source database where scripts and other text files used during backup activities are stored. |
| TEMP_DIRECTORY | Specifies a location on the source database where scripts and other text files used during backup activities are stored. |
| DEGREE_OF_PARALLELISM | Specifies how many copy commands should be launched in parallel. |
| DESTINATION_TEMP_DIRECTORY | Specifies a location on the target server that is used for copying temporary files and testing purposes. |

TABLE I-continued

Examples of Configuration File Parameters

| Configuration File Parameters | Descriptions |
| --- | --- |
| TEMPDIRECTORY_RETENTION | Specifies a number of previous temporary directories that should be retained in addition to the current one. |
| DATAFILECOPY_DELAY = 10 | Specifies a delay, in seconds, between attempts to submit file copy commands in parallel. |
| BACKUP_DIRECTORIES | Specifies backup directories on the source database. |
| BACKUP_EXTENSION | Specifies a file extension for backup datafiles. |
| BACKUP_RETENTION | Specifies a number of previous backups that should be retained in addition to the current one. |
| SOURCE_DATABASE_ENVIRONMENT | Specifies a script that will set up the environment to successfully connect to the source database. |
| TARGET_DATABASE_ENVIRONMENT | Specifies a script that will set up the environment to successfully connect to the target database. |
| INITIATECOPY_FROM_TARGET | Specifies that a file copy command should be initiated from the target server (pull) instead of the source server (push). |
| DEBUG_LEVEL | Specifies a level of output that is displayed by the script. |
| PROGRESS_METER | Specifies how progress should be displayed. |
| FAILURE_NOTIFICATION_TEST | Specifies the list of email recipients that will get a notification on a backup failure. |
| CUSTOMER | Specifies a customer name associated with the source database. |
| COPY_PROGRAM | Specifies an O/S program to be used to copy datafiles. |
| DATAFILENAME_TRANSLATION | Specifies a shell script that will translate datafile names from a source database to a target database. |
| EXPORT_TARGET_DIRECTORY | Specifies a directory on a target server where export files generated from a target database are stored. |
| EXPORT_TARGET_SCHEMA | Specifies a list of schemas that will be exported prior to a clone process and imported back after the clone has been completed. |
| EXPORT_TARGET_TABLES | Specifies a list of tables that will be exported prior to a clone process and imported back after the clone has been completed. |
| EXPORT_PARAMETER_FILES | Specifies a list of export parameter files that presumably specify custom lists of objects that will be exported prior to a clone process. |
| SAVE_PASSWORD_SCHEMA | Specifies a list of schemas for which passwords and privileges are to be preserved across clones. |
| COPY_RETRIES | Specifies the number of attempts to resume execution of a backup, refresh, and/or cloning operation after failure. |
| STAGED_REFRESH | Specifies if stage directories are to be used while performing refreshes. |
| STAGED_SERVER | Specifies the location of the stage directories used in a staged refresh. |
| STAGED_DIRECTORIES | A list of stage directories where the datafiles are to be "staged." |

For embodiments operating in a UNIX environment, the configuration parameters can be shell variables having the form "export keyword=value." The shell variables are read by one or more shell scripts 232 (e.g., Bourne), which can include one or more programs and/or subshell scripts for implementing one or more phases of the process 300 described with respect to FIG. 3. In some embodiments, the scripts are automatically generated in the control environment 200 by the script generator 240 using various information, including locations of source and target databases 110, 116, program availability (e.g., scp, rsync, etc.), operating system type (e.g., UNIX, LINUX, WINDOWS, etc.), and database version (e.g., ORACLE 7, ORACLE 9i, etc.). In some embodiments, the script generator 240 can be a control script, program or database facility configured to write commands to text files, which are then used by shell scripts to perform various backup and cloning tasks. For example, to connect to a target server 114 and query about a UNIX version implemented on the target server 114, a control script can be configured to generate the following task script for establishing secure connectivity between source and target servers:

| Script Statements | Actions |
| --- | --- |
| echo "ssh targetserver uname" > tempScript | Write secure connectivity command "ssh" to text file "tempScript" to connect to "target server uname." |
| chmod +x tempScript | Sets the execution permissions on this script. |
| tempScript | Executes the command. |

The first line of the script writes text to the file "tempScript." The second line sets the execute permissions on the script. The third line executes the command "ssh." Executing the command "ssh" establishes a secure connection between the source server (where the script is executed) and "target-server uname."

In a UNIX environment, an example of a configuration file 228 for a generic backup operation could have the following format:
export SOURCE_DATABASE=databaseA
export SOURCE_SERVER=server1
export TARGET_SERVER=server2
export SOURCE_OWNER=oracle
export TARGET_OWNER=oracle
export COMPRESS_UTILITY="gzip-c"
export UNCOMPRESS_UTILITY="gunzip-c"
export CACHE_DIRECTORY=./pathname/directory_name
export TEMP_DIRECTORY=./pathname/directory_name
export DEGREE_OF_PARALLELISM=8
export DESTINATION_TEMP_DIRECTORY=/pathname/directory_name
export TEMPDIRECTORY_RETENTION=2
export DATAFILECOPY_DELAY=10
export BACKUP_DIRECTORIES="/pathname/directory_name"
export BACKUP_EXTENSION=.gz
export BACKUP_RETENTION=1

A shell script 232 (e.g., Bourne, Korn, c-shell, etc.) reads the configuration parameter values and performs a discovery operation using one or more utilities (e.g., oraenv, envsel, custom, etc.). The discovery operation ensures that all key requirements for performing a backup from the source environment 102 are satisfied, and that datafiles stored in databases 110 can be access and copied during database cloning. Referring to the configuration file 228 above, datafiles will be compressed and uncompressed during database backup using the UNIX utilities "gzip" and "ungzip." It should be apparent, however, that any compression utilities can be used to compress and uncompress datafiles. Also, a rule of thumb for selecting a value for the keyword DEGREE_OF_PARALLELISM is the minimum number of processors on the source server 108 and target server 114, which in this example is 8, i.e., there are 8 processors in the source and target servers 108, 114.

Note that by default, the parameter values are local to the current shell and will not be passed on to programs or sub-shells running under the current shell. To make the values global so that child processes can inherit them, the shell command "export" is used, which adds the parameter value to the UNIX environment, where it is accessible to other programs and shells.

A configuration file 228 for a generic refresh and clone script 232 could have the following format:
export SOURCE_DATABASE=databaseA
export TARGET_DATABASE=databaseB
export SOURCE_SERVER=server1
export TARGET_SERVER=server2
export SOURCE_OWNER=oracle
export TARGET_OWNER=oracle
export COPY_PROGRAM="cp"
export CACHE_DIRECTORY=/pathname/directory_name
export TEMP_DIRECTORY=/pathname/directory_name
export COPY_RETRIES=2
export DEGREE_OF_PARALLELISM=4
export SOURCE_DATABASE_ENVIRONMENT=/pathname/directory_name
export TARGET_DATABASE_ENVIRONMENT=/pathname/directory_name
export DATAFILENAME_TRANSLATION=translate_function.sh Similar to the backup shell script 232, a refresh and clone shell script 232 reads the configuration parameter values from the configuration file 228 and performs a discovery operation using one or more utilities (e.g., oraenv, envsel, etc.) to ensure that all key requirements for receiving datafiles from the target environment 104 are satisfied, and that datafiles stored in databases 110 can be accessed. Referring to the configuration file 228 above, the datafiles will be copied using the UNIX utility "cp." It should be apparent, however, that any copy utility can be used to copy datafiles (e.g., rsync). Also, note that COPY_RETRIES was assigned the value of 2, indicating that after two failures the backup operations will be aborted. However, this value can be greater depending upon available resources.

The control file 230 contains entries that specify the physical structure of the databases 110. For example, it may contain a database name, the names and locations of datafiles and redo log files, and a timestamps of creation for databases 110. When an instance (e.g., ORACLE server instance) of a database 110 is started, the control file 230 associated with the database 110 identifies the database 110 and redo log files that must be opened for database operation to proceed. If the physical makeup of the database 110 is altered (e.g., if a new datafile or redo log file is created), then the control file 230 can be automatically modified to reflect the change.

The archive logs 234 are used to record changes made to the databases 110 during normal operation. For example, the archive logs 234 can be used during recovery to reapply the changes made to the databases 110 when such changes are not permanently written to the datafiles at the time of failure. In ORACLE environments, an archiver utility (e.g., ARCn) copies online redo log files to archival storage after a log switch has occurred.

Databases typically include logical structures (e.g., schema object, data blocks, extents, segments, tablespaces, etc.) and physical structures (e.g., datafiles, redo log files, control files, etc.). Because the physical and logical structures are separate, the physical storage of data can be managed without affecting the access to logical storage structures. The datafile map 234 is used in one or more phases of the process 300 to map logical structures (e.g., tablespaces) to associated physical structures (e.g., datafiles), as described with respect to FIGS. 3-8.

During backup operations, the datafile map 234 specifies the mapping between source datafiles and backup datafiles. In some embodiments, during cloning operations, the datafile map 234 specifies the mapping between the datafiles belonging to the source database 110 and those belonging to the target database 116. For example, if the source database 110 contains a file named, /u01/app/oradata/SOURCE/appdata1.dbf and a corresponding backup file named /u06/app/backup/SOURCE/appdata1.dbf.gz, the relationship between these files can be explicitly specified in the datafile map 234. This enables backup and cloning scripts to determine which source database 110 will receive a target database 116 (e.g., backup or refresh and clone) during recovery operations. In some embodiments, the datafile map 234 is generated during a discovery phase 302 (FIG. 3), so that an operator can predetermine the destination of backup datafiles and/or refresh and clone datafiles prior to initiating a backup and/or refresh and clone operation.

The database meta data 238 includes text files that contain information about the source database 110 and target database 116, which is used to perform refresh and clone operations when the target database 116 has been previously shutdown and cannot be queried for information (e.g., repeated refresh and clone operations). In some embodiments, the meta data 238 is generated by one or more scripts in the discovery phase 302.

Process Overview

FIG. 3 is a flow diagram of an embodiment of an automated physical database backup and/or database and application refresh or cloning process 300 performed by the system 100 shown in FIG. 1. The process 300 can be conceptually broken down into five phases: a discovery phase 302, a pre refresh and clone phase 304, a datacopy phase 306, a target recovery phase 308 and a post refresh and clone phase 310. The process flow for each phase is described in turn below. While the process 300 described below includes a number of steps that appear to occur in a specific order, it should be apparent that the process 300 steps are not limited to any particular order, and, moreover, the process 300 can include more or fewer steps, which can be executed serially or in parallel (e.g., using parallel processors or a multi-threading environment).

Discovery Phase

Figure 4A:
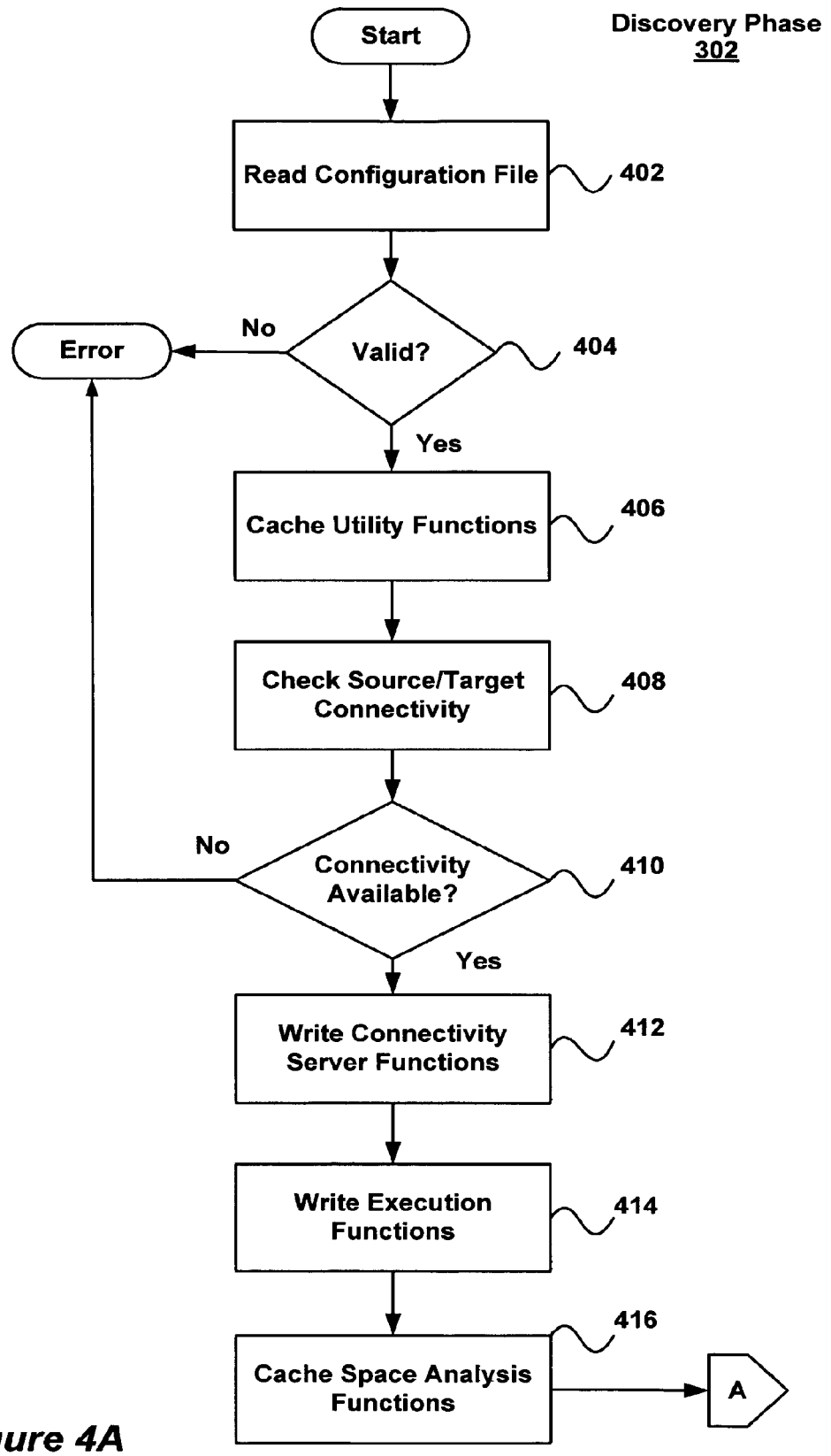
FIGS. 4A-4C are flow diagrams of an embodiment of a discovery phase of the process shown in FIG. 3.
Figure 4B:
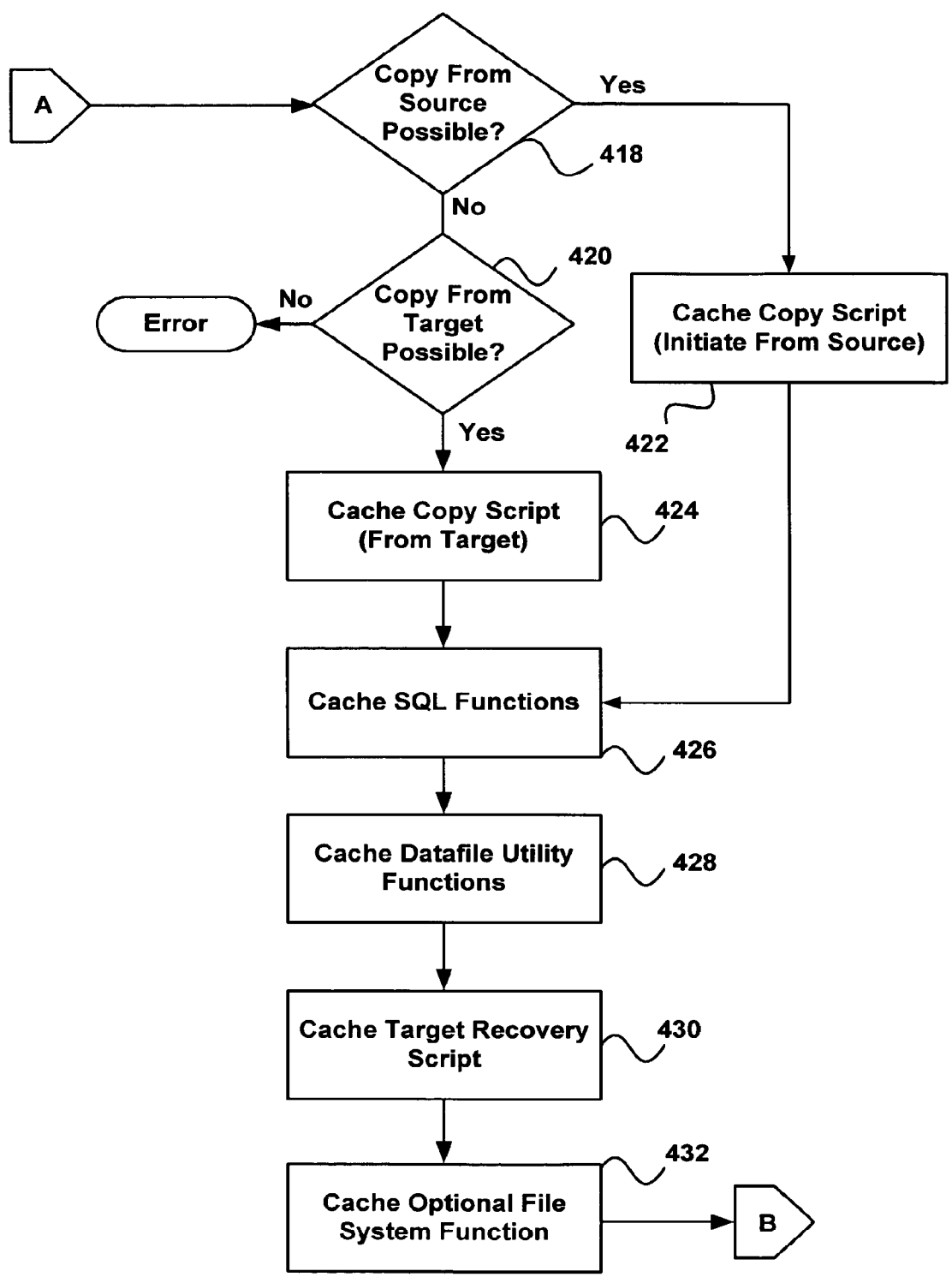
Figure 4C:
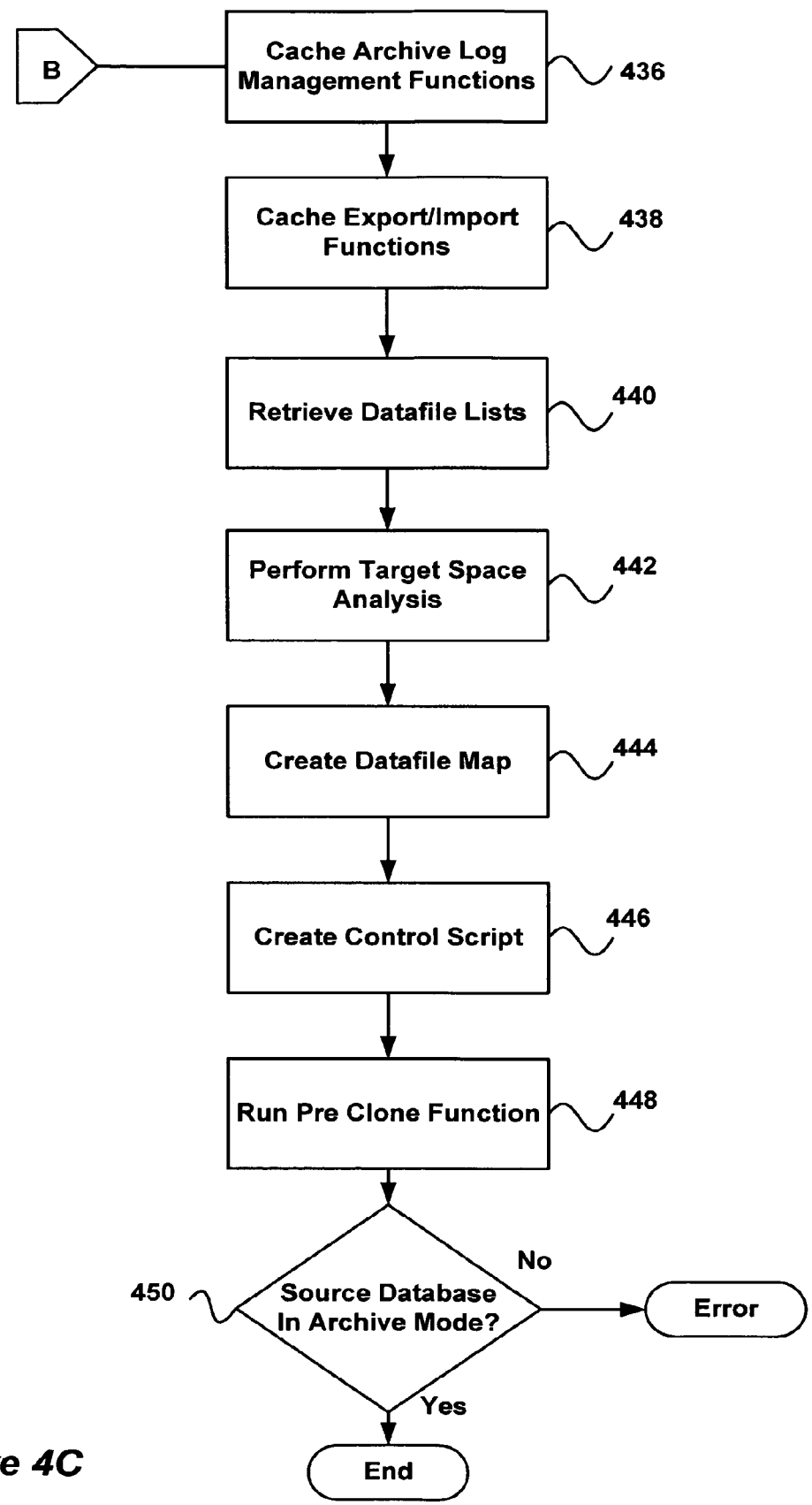

FIGS. 4A-4C are flow diagrams of an embodiment of a discovery phase 302 of the process 300 shown in FIG. 3. In some embodiments, the discovery phase 302 is implemented by the discovery module 242 shown in FIG. 2.

Referring to FIG. 4A, the discovery phase 302 begins by reading a configuration file 228 (step 402). The configuration file 228 is checked for any errors (step 404). Errors can include syntax errors, formatting errors and the like. If the configuration file 228 is invalid, then an error exists in the configuration file 228, resulting in the process 300 being aborted and an error message being presented to the DBA (e.g., via display 212).

If the configuration file 228 is valid, then any utility functions needed for backup and cloning are cached in memory 204 (step 406), and the connectivity between the source server 108 and the target server 114 is checked (step 408). In some embodiments, connectivity is checked by issuing an "ssh" command to the target server 114 (if applicable) and ensuring that the command successfully executes. If source/target connectivity is not available (step 410), then an error has occurred, resulting in the process 300 being aborted and an error message is presented to the DBA via display 212. If connectivity is available, then the connectivity server functions and the appropriate execution functions are written to text files (steps 412, 414), which will be executed as shell scripts, and one or more space analysis functions are cached (step 416). Note that the space analysis functions determine if the target file systems (for backup and cloning) have sufficient space allocated so that the backup or cloning can successfully complete.

Referring to FIG. 4B, the process 300 continues by determining if a copy from the source database 110 is possible (step 418) by using the copy command provided in the configuration file 228. If a copy from the source databases 110 is possible, then a source initiated copy script is cached (step 422). In some embodiments, the copy script is generated during the discovery phase 302. If a copy from the source databases 110 is not possible (step 118), then the process 300 determines if a copy from the target databases 116 is possible (step 420) based on information gathered in the discovery phase 302. If a copy from the target databases 116 is possible, then a target initiated copy script is cached (step 424). If a copy from the target databases 116 is not possible, then an error will occur, resulting in the process 300 being aborted and an error message being presented to the DBA via the display 212.

After caching either the source initiated copy script or the target initiated copy script (step 422 or 424), then SQL functions are cached (step 426), datafile utility functions are cached (step 428), a target recovery script is cached (step 430), an optional file system function is cached (step 432), archive management log functions are cached (step 436) and export/import functions are cached (step 438). In some embodiments, the SQL functions are SQL Execution functions, which are shell scripts that provide an abstraction over the complexity of setting up a database environment, executing SQL programs (e.g., sqlplus for ORACLE environments) and returning values to calling functions. Upon completion of steps 426-438, datafile lists are retrieved (step 440) from the source and target databases 110, 116, a target space analysis is performed on the target databases 116 (step 442), a datafile map 234 is completed (step 444) by comparing the source and target datafile lists, and a control script is created (step 446) by executing a database provided facility.

The discovery phase 302 completes by running a pre refresh and clone function (step 448), which performs certain actions, such as exporting certain objects from the target database 116, and checking to see if the source databases 110 are in archive mode (step 450). If the source databases 110 are in archive mode, then the discovery phase 302 ends and the process 300 begins the pre refresh and clone phase 304. If the source databases 110 are not in archive mode, then an error has occurred, resulting in the process 300 being aborted and an error message being presented to the DBA via the display 212. Note that step 450 can be executed for ORACLE databases or database technologies having an equivalent of an ORACLE archive mode. An ORACLE database can operate either in archive log mode or noarchive log mode. In archive log mode, redo log files that are generated are also archived. In some embodiments, a database can only be recovered from a media failure if it runs in archive mode. Thus, if the source databases 110 are ORACLE databases, they should be in archive mode or an error will occur in step 450. In other embodiments, a database can be recovered from a media failure even if it is not in archive mode.

Figure 5:
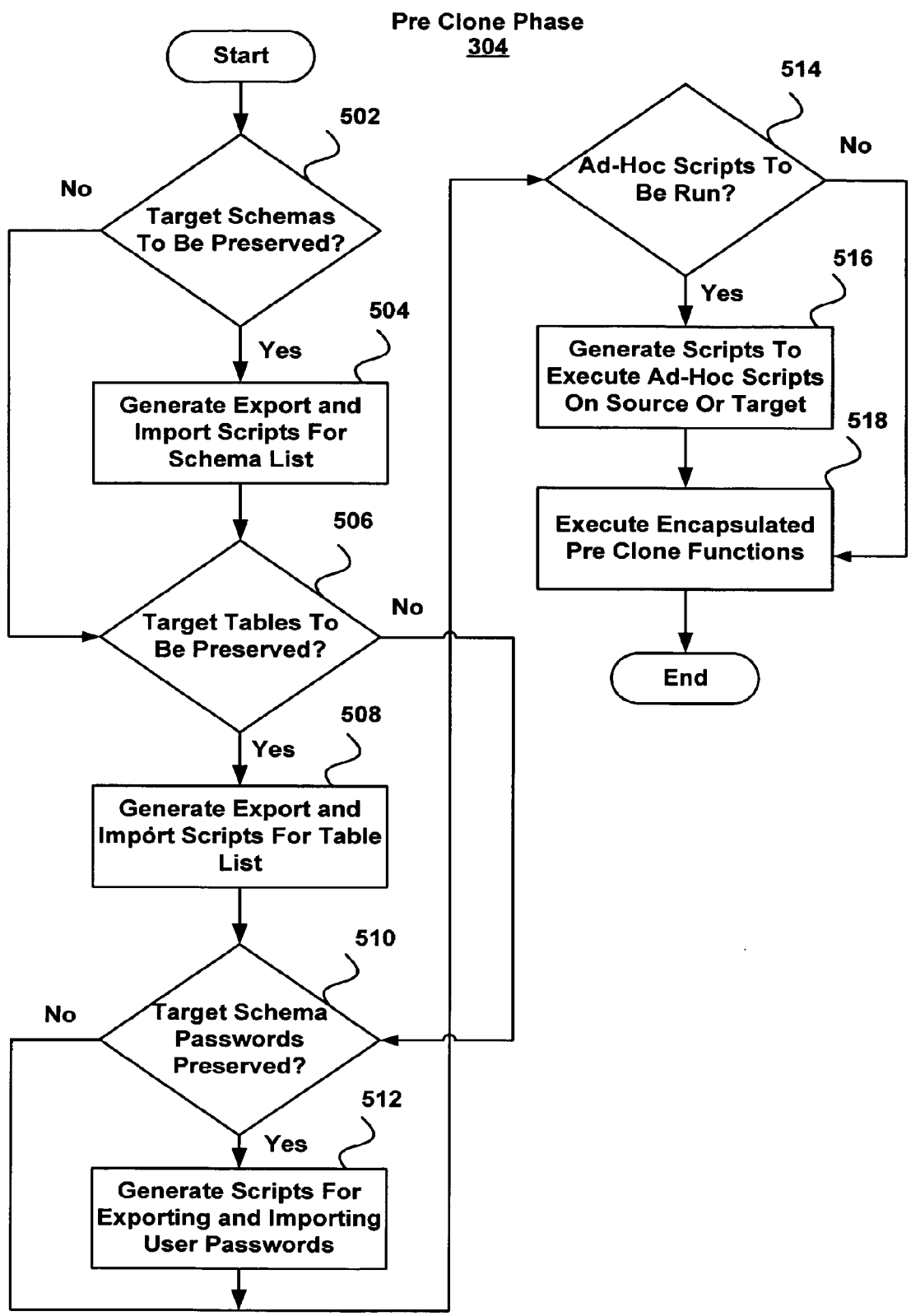
FIG. 5 is a flow diagram of an embodiment of a pre clone phase of the process shown in FIG. 3.

FIG. 5 is a flow diagram of an embodiment of a pre refresh and clone phase 304 of the process 300 shown in FIG. 3. The pre refresh and clone phase 304 begins by determining if any target schemas or objects are to be preserved (step 502). A schema is a collection of database objects, which are typically owned by a database user and may have the same name as that user.

If target schemas are to be preserved, then export and import scripts are generated for a target schema list (step 504). After generating export and import scripts for the target schema list or if target schemas are not to be preserved (step 502), then the process 300 determines if target tables are to be preserved (step 506). A table is a schema object, which is a logical structure that directly refers to data. In some databases (e.g., ORACLE), tables are a basic unit of storage and typically hold user-accessible data.

If target tables are to be preserved, then export and import scripts are generated for a target table list (step 508). After the export and import scripts are generated for a target table list or if target tables are not to be preserved (step 506), then the process 300 determines if target schema passwords are to be preserved (step 510), if target schema passwords are to be preserved, the scripts for exporting and importing passwords are generated (step 512). After scripts for exporting and importing passwords are generated or if target schema passwords are not to be preserved (step 510), then the process 300 determines if any ad-hoc scripts are to be run (step 514). For example, if a list of users needs to be preserved (i.e., not the users themselves), then an SQL script is written that executes against the target database 116 during the pre refresh and clone phase 304. If there are ad-hoc scripts to be run, then scripts to execute ad-hoc scripts on the source or target servers 108, 114, are generated (step 516). After generation of scripts to execute ad-hoc scripts or if there are no ad-hoc scripts to be run (step 514), then encapsulated pre refresh and clone functions will be run (step 518) and upon their completion the pre refresh and clone phase 304 will transition in the data copy phase 306.

Data Copy Phase

Figure 6A:
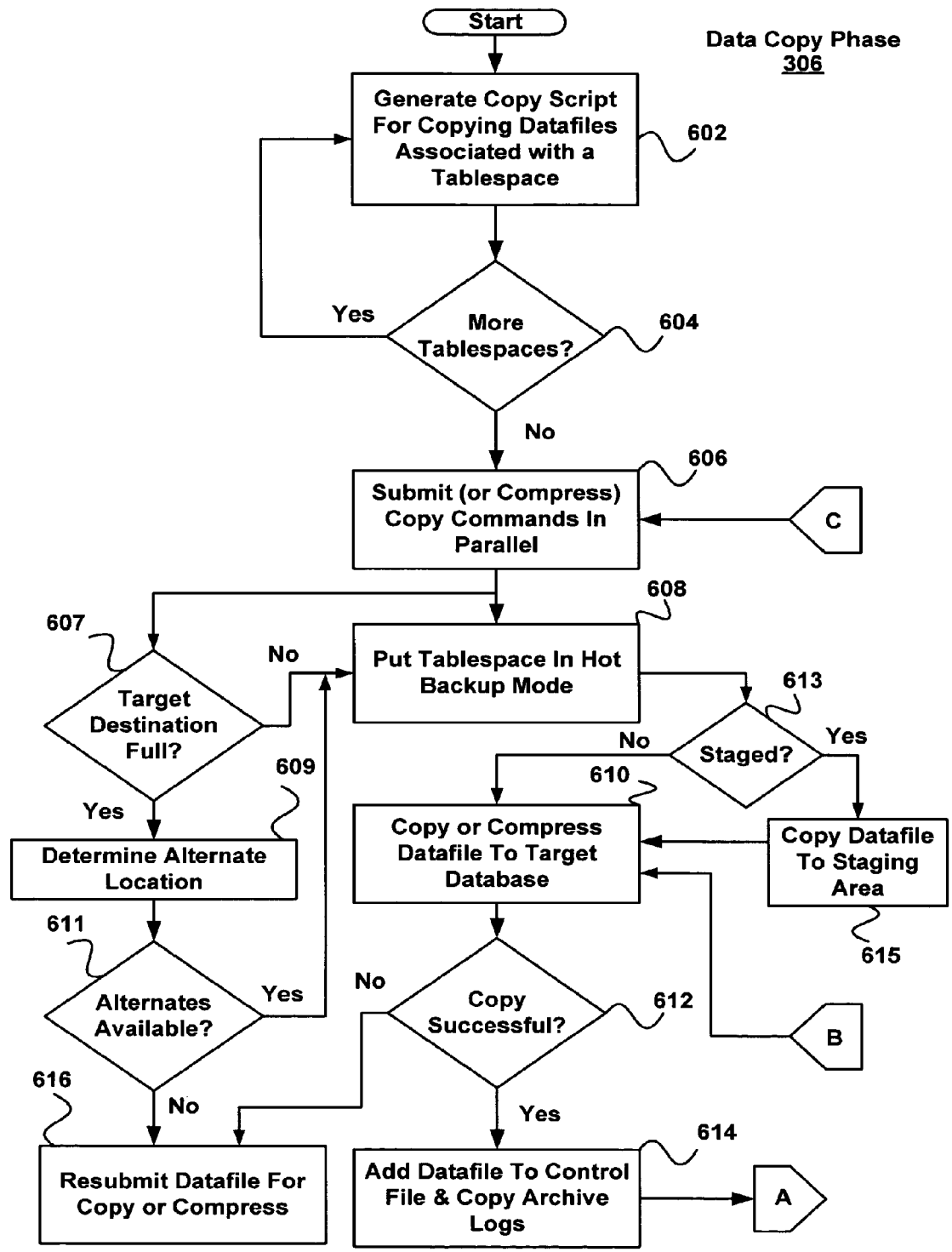
FIGS. 6A-6B are flow diagrams of an embodiment of a data copy phase of the process shown in FIG. 3.
Figure 6B:
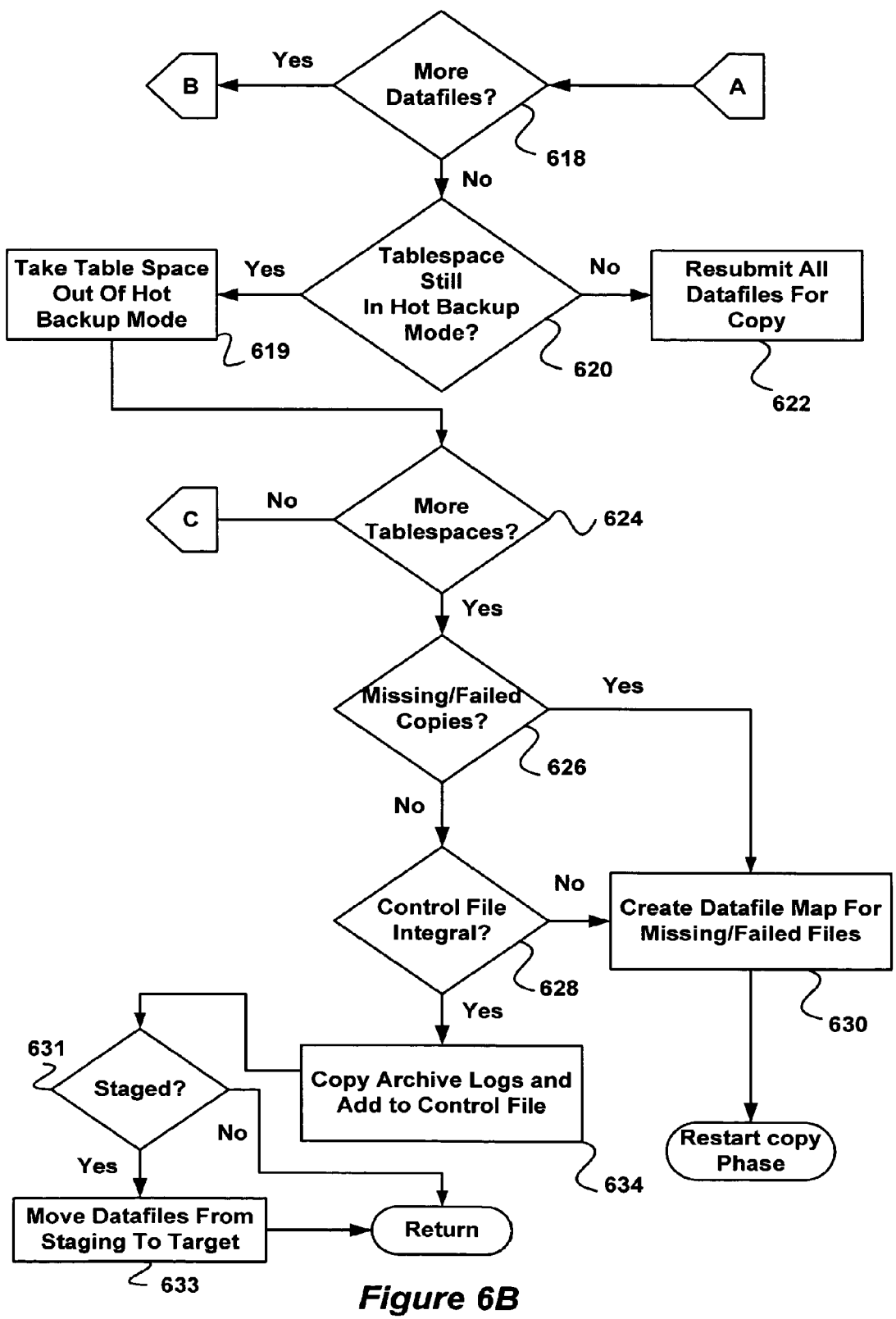

FIGS. 6A-6B are flow diagrams of an embodiment of a data copy phase 306 of the process 300 shown in FIG. 3. The data copy phase 306 begins by generating a copy script for each tablespace in the source database (step 602). Some databases (e.g., ORACLE) are typically divided into logical storage units called tablespaces, which group related logical structures together. For example, tablespaces commonly group together all application objects to simplify some administration operations.

Referring to FIG. 6A, if there are no more tablespaces (step 604), then copy commands are submitted (or compressed) in parallel (step 606) and each tablespace is put in hot backup mode (step 608). If a staged refresh is to be performed (step 613), then datafiles are copied to a staging area. Otherwise, each datafile associated with the current tablespace is then copied to the target database 116 (step 610). If the copy was successful (step 612), then the datafile is added to the control file 230 and copy archive logs (step 614). If the copy is unsuccessful, then the datafile is resubmitted for copy or compression (step 616). In some embodiments, backup can be used as a source for performing "staged" refresh operations. A staged refresh is not performed by directly copying datafiles to the target server. Rather, a set of stage directories is identified on either the source server or the target server and the datafiles are copied over to those locations and subsequently moved to a final destination. The configuration file parameter STAGED_REFRESH can be used to specify whether stage directories will be used while performing refreshes. The configuration file parameter STAGED_SERVER specifies the location of the stage directories used in staged refresh. The configuration file parameter STAGED_DIRECTORIES specifies a list of stage directories.

If the target destination is full due to limited storage space (step 607), then an alternate location is determined (step 609). If an alternate location is available (step 611), then the process 300 returns to step 608. If an alternative location is not available, then the datafile is resubmitted for copy or compression (step 616). Thus, an advantage of this embodiment is that datafiles can be dynamically allocated to different storage areas of the target environment 104 if the target storage area becomes full.

Referring now to FIG. 6B, if there are more datafiles (step 618), then the process 300 transitions to step 610 (FIG. 6A), where the next datafile is copied (or compressed) to the target database 116 (or backup). If there are no more datafiles (step 618) and the tablespace is no longer in hot backup mode (step 620), then the datafiles are resubmitted for copy (or compressed) (step 622). If the tablespace is still in hot backup mode, then the tablespace is taken out of hot backup mode. If there are no more tablespaces to process (step 624), then the process 300 transitions to step 606, where again one or more copy (or compress) commands are submitted in parallel. If there are more tablespaces to process (step 624), no failed copies (or compress) (step 626) (e.g., by examining a return value from the copy or compress commands) and the control file 230 is integral (step 628), then the archive logs are copied and added to the control file 230 (step 634). If staged operations were performed in step 613 (stage 631), then those datafiles are moved from the staging area to the target database and the data copy phase 306 transitions to the target recovery phase 308. If there are failed copies (step 626) and/or the control file 230 is not integral (step 628), then a datafile map is created for the missing or failed files (step 630) and the data copy phase 308 is restarted at step 602. In some embodiments, to determine whether the control file 230 is "integral" in step 628, a list of datafiles contained in the source database 110 is compared with a list of datafiles contained in the control file 230, which includes only those datafiles that were successfully copied or compressed.

Note that the steps of resubmitting a datafile for copy or compression (step 616), resubmitting all datafiles for copy or compression (step 622) and creating a datafile map for missing/failed datafiles may include automatically regenerating and/or executing scripts. The capability of the process 300 to automatically regenerate and/or execute scripts in response to a failure of the source environment 102 and/or the target environment 104 provides an important advantage over conventional systems and methods that require user intervention to restart a failed database backup and/or database and application refresh or cloning task.

Target Recovery Phase

Figure 7:
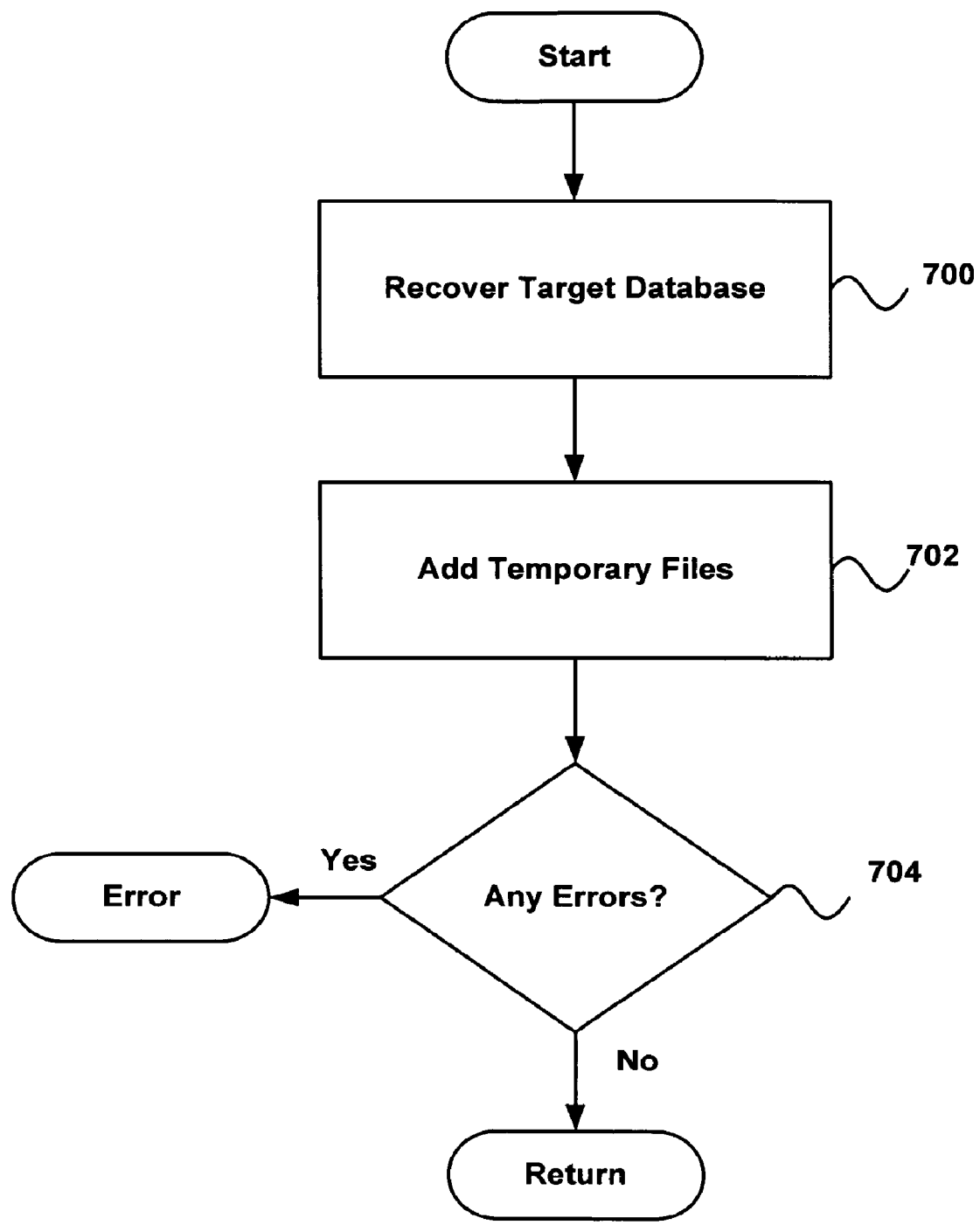
FIG. 7 is a flow diagram of an embodiment of a target recovery phase of the process shown in FIG. 3.

FIG. 7 is a flow diagram of an embodiment of a target recovery phase 308 of the process 300 shown in FIG. 3. The target recovery phase 308 begins by recovering the target database 116 (step 700) and adding temporary files (step 602) to it. In some embodiments, temporary files are not copied from the source database 110 to the target database 116 (or backup). If there are no errors (e.g., based on an error code returned by the scripts), then the target recovery phase 308 ends. If there are errors, then the target recovery phase 308 will abort and an appropriate error message will be presented to the DBA via the display 212.

Post Refresh and Clone Phase

Figure 8:
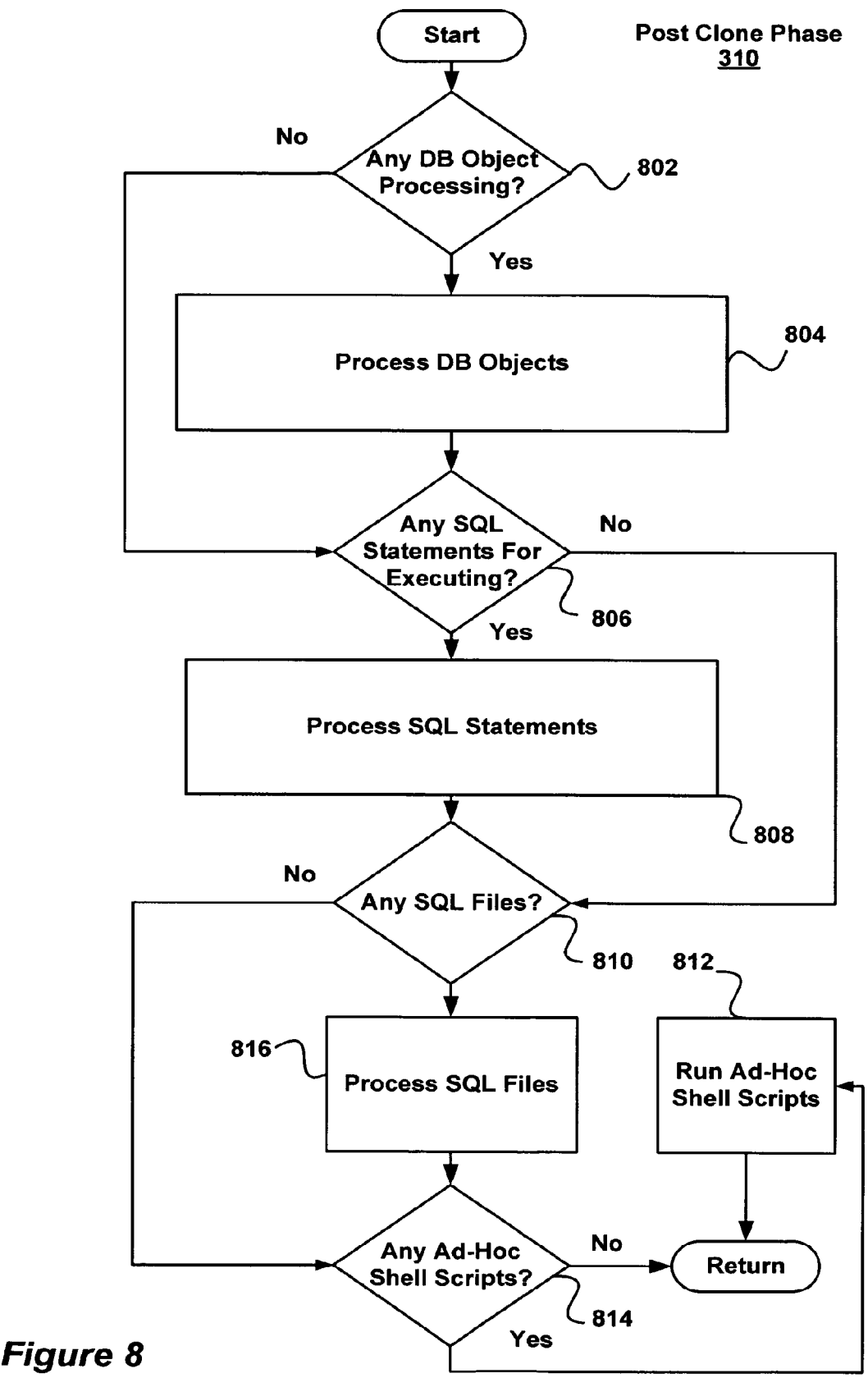
FIG. 8 is a flow diagram of an embodiment of a post clone phase of the process shown in FIG. 3.

FIG. 8 is a flow diagram of an embodiment of a post refresh and clone phase 310 of the process 300 shown in FIG. 3. The post refresh and clone phase 310 begins be determining if any database object needs processing (step 802), based on the configuration file 228. If a database object needs processing, then the database objects are processed (step 804). For example, such processing can include insert/update/delete operations of certain values. If there no database objects that need processing, then the process 300 transitions directly to step 806.

If any SQL statements need to be executed (step 806), then those SQL statements are processed (step 808) based on the configuration file 228. After processing the SQL statements or if there are no SQL statements that need processing, then the process 300 transitions to step 814.

If any ad-hoc shell scripts need to be run (step 814), then the ad-hoc shell scripts are run (step 812) and the post refresh and clone phase 310 ends. After running the ad-hoc scripts or if there are no ad-hoc shell scripts to be run, then the post refresh and clone phase 310 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for backing up a database, the method comprising the steps of:
   a control computer determining configuration parameters of a source computer and configuration parameters of a target computer, the source computer and the target computer having different configurations than each other;
   the control computer generating scripts based at least in part on the configuration parameters of at least one of the source computer and the target computer to initiate at least one task relating to database backup operations between the source computer and the target computer;
   the control computer recognizing a failure associated with at least one of the source computer and the target computer in the backup of the database;
   the control computer storing information identifying the recognized failure; and
   the control computer using the stored information corresponding to the recognized failure to automatically regenerate at least one of the scripts in response to the recognized failure.

2. The method of claim 1, further comprising the step of the control computer automatically executing the automatically regenerated script.

3. The method of claim 1, wherein the information corresponding to the recognized failure is stored in a datafile map, wherein the regenerated at least one script is based at least in part on the datafile map.

4. The method of claim 1, wherein the at least one task includes determining if one or more file systems in the target computer have sufficient space allocated for at least one database backup operation.

5. The method of claim 1, wherein the at least one task includes storing one or more functions associated with the task prior to performing the task.

6. The method of claim 5, wherein the functions include a file system function.

7. The method of claim 5, wherein the functions include an archive log function.

8. The method of claim 5, wherein the functions include at least one of export and import functions.

9. The method of claim 1, wherein the at least one task includes generating a datafile map for specifying a mapping between datafiles belonging to the source computer and datafiles belonging to the target computer.

10. The method of claim 1, wherein the at least one task includes generating a control script for controlling at least one data backup operation.

11. The method of claim 1, wherein the at least one task includes:
   executing pre database backup functions for exporting objects from the target computer and determining if a source database in the source computer is in archive mode.

12. The method of claim 1, wherein the at least one task includes storing a target recovery script.

13. The method of claim 1, wherein the at least one task includes:
   determining if target schema user passwords are to be preserved; and
   generating scripts for preserving target schema user passwords if target schema user passwords are to be preserved.

14. The method of claim 1, wherein the at least one task includes:
   determining if ad-hoc scripts are to be run; and
   generating scripts for executing ad-hoc scripts if ad-hoc scripts are to be run.

15. The method of claim 1, wherein the at least one task includes generating a copy script for copying datafiles associated with a tablespace.

16. The method of claim 1, wherein the control computer resides in the source computer.

17. The method of claim 1, wherein the control computer resides in the target computer.

18. The method of claim 1, wherein the control computer resides in a third computer different from the target computer or source computer.

19. An automated physical database backup computer system including a source computer, a target computer, and a control computer, the computer system comprising:
   a central processing unit (CPU), a computer-readable memory, and a computer-readable, tangible storage device residing in the control computer;
   first program instructions to determine configuration parameters of the source computer and configuration parameters of the target computer, the source computer and the target computer having different configurations than each other;
   second program instructions to generate scripts based at least in part on the configuration parameters of at least one of the source computer and the target computer to initiate one or more tasks related to database backup operations between the source computer and the target computer;
   third program instructions to recognize a failure associated with at least one of the source computer and the target computer in the backup of the database;
   fourth program instructions to store information identifying the recognized failure; and
   fifth program instructions to use the stored information identifying the recognized failure to automatically regenerate at least one of the scripts in response to the recognized failure, and wherein the first, second, third, fourth and fifth program instructions are stored on the computer-readable tangible storage device for execution by the CPU via the computer-readable memory.

20. A computer program product for backing up a database, the computer program product comprising:
   a computer readable tangible storage device(s);
   first program instructions to determine configuration parameters of the source computer and configuration parameters of the target computer, the source computer and the target computer having different configurations than each other;
   second program instructions generating scripts based at least in part on the configuration parameters of at least one of the source computer and the target computer to initiate one or more tasks relating to database backup operations between the source computer and the target computer, generating scripts including using at least one configuration parameter;

third program instructions to recognize a failure associated with at least one of the source computer and the target computer in the backup of the database;

fourth program instructions to cause information identifying the recognized failure to be stored; and fifth program instructions to use the stored information identifying the recognized failure to automatically regenerate at least one of the scripts in response to the recognized failure, and wherein the first, second, third, fourth and fifth program instructions are stored on the computer readable storage device(s).

* * * * *